United States Patent [19]

Mikami et al.

[11] Patent Number: 4,552,919

[45] Date of Patent: Nov. 12, 1985

[54] ROOM TEMPERATURE-CURABLE POLYORGANOSILOXANE COMPOSITION WHOSE CURED PRODUCTS RESIST SOILING

[75] Inventors: Ryuzo Mikami, Ichihara; Toshio Saruyama, Narashino, both of Japan

[73] Assignee: Toray Silicone Company, Ltd., Tokyo, Japan

[21] Appl. No.: 624,161

[22] Filed: Jun. 25, 1984

[30] Foreign Application Priority Data

Jul. 8, 1983 [JP] Japan ................ 58-124124

[51] Int. Cl.$^4$ .............................. C08L 83/04
[52] U.S. Cl. ..................... 524/860; 524/859; 524/425; 524/431; 524/432; 528/17; 528/18; 528/33; 528/34; 528/901
[58] Field of Search ............ 528/33, 34, 17, 18, 528/901; 524/859, 860, 425, 431, 432

[56] References Cited

U.S. PATENT DOCUMENTS 4,444,974  4/1984  Takase et al. .............. 528/901

FOREIGN PATENT DOCUMENTS 76452  6/1981  Japan .
76453  6/1984  Japan .

*Primary Examiner*—Melvyn I. Marquis
*Attorney, Agent, or Firm*—Roger H. Borrousch

[57] ABSTRACT

A cured product which resists soiling under outdoor exposure obtained from a mixture of a silanol containing polyorganosiloxane having at least one silicon-bonded oxyalkylene radical of the formula —$R^1O(R^2O)_nR^3$ and a curing agent.

15 Claims, No Drawings

ROOM TEMPERATURE-CURABLE POLYORGANOSILOXANE COMPOSITION WHOSE CURED PRODUCTS RESIST SOILING

BACKGROUND OF THE INVENTION

1. Field of the Invention

This invention relates to a room temperature-curable polyorganosiloxane composition. More specifically, this invention relates to a room temperature-curable polyorganosiloxane composition whose cured surface is difficult to soil and which does not soil a substrate which has been brought into contact with the cured composition.

2. Background Information

Room temperature-curable polyorganosiloxane compositions and particularly polyorganosiloxane compositions which can be cured at room temperature into a rubbery material are conventionally used in a broad range of applications such as electric insulating materials, barrier materials, for sealing containers, and as sealants. However, when such a room temperature-curable polyorganosiloxane composition is employed as above, it readily adheres or adsorbs dust. In particular, when it is employed as a construction sealant on a building exterior, liquid polyorganosiloxane gradually migrates from the cured silicone rubber to the surrounding building wall where it becomes soiled, resulting in a deteriorated external appearance for the building. This is a defect of many prior art room temperature-curable polyorganosiloxane compositions. Methods for eliminating this defect have been proposed in which a surfactant such as a polyoxyalkylene compound or its polyorganosiloxane copolymer is added to the composition such as referred to in Japanese Kokai Pat. No. 56-76453(81-76453), published June 24, 1981, and Japanese Kokai Pat. No. 56-76452(81-76452), published June 24, 1981.

However, the addition of a surfactant significantly reduces the adhesiveness, which is indispensable in a sealant to be used for buildings, and, furthermore, this strategy does not satisfactorily prevent soiling.

Various methods were examined by the present inventors in order to eliminate the defect of easy soiling in prior art room temperature-curable polyorganosiloxane compositions and this invention was developed as a result.

SUMMARY OF THE INVENTION

This invention relates to a room temperature-curable polyorganosiloxane composition consisting essentially of a polyorganosiloxane which possesses at least one silicon-bonded oxyalklene radical of the general formula $-R^1O(R^2O)_nR^3$ wherein each $R^1$ and $R^2$ represent a divalent alkylene radical, $R^3$ is a radical selected from alkyl, acyl, or hydrogen and n is 0 or an integer with a value $\geq 1$ and said polyorganosiloxane having at least 2 silanol groups per molecule and a curing agent.

DETAILED DESCRIPTION OF THE INVENTION

Component (A) is the principal component of the room temperature-curable polyorganosiloxane composition produced by the method of this invention and reacts with component (B) in a crosslinking and curing process.

The molecular configuration is linear chain, branched chain, or network. The degree of polymerization ranges from at least oligomeric to an upper limit which is such that component (A) is a fluid at room temperature. The silicon-bonded oxyalkylene radical of the general formula $-R^1O(R^2O)_nR^3$ wherein $R^1$, $R^2$ and $R^3$ and n are defined above, has the function of suppressing the soiling of the surrounding area. The polyorganosiloxane contains at least 1 oxyalkylene radical as specified above and this radical preferably comprises $\geq 0.1$ mol % of the total organic radicals of the polyorganosiloxane in order for its soiling suppression effect to be exhibited satisfactorily.

The $R^1$ in the general formula represents a divalent alkylene group and illustrative examples are ethylene, n-propylene, n-butylene, n-hexylene group, and $-CH_2CH(CH_3)-CH_2-CH_2-$.

$R^2$ also represents divalent alkylene radicals and illustrative examples are methylene, ethylene, propylene, and n-butylene. The number of carbons is preferably $\leq 4$ from the standpoint of the soiling suppression effect.

$R^3$ represents an end-blocking radical and illustrative examples are alkyl, such as methyl, ethyl, and hexyl; acyl such as acetyl and propionyl; and the hydrogen atom.

Organic radicals other than the above-mentioned oxyalkylene radicals can be present in component (A) and illustrative examples are alkyl, such as methyl, ethyl, and hexyl; haloalkyl, such as 3,3,3-trifluoropropyl and 3-chloropropyl; aryl, such as phenyl and naphthyl; and alkenyl, such as vinyl and allyl.

Because the silanol group serves as the crosslinking point, at least 2 must be present per molecule and these groups are preferably present at each terminal when the polyorganosiloxane is linear or branched.

Component (A) can be produced by the hydrolysis or cohydrolysis of 1 to 3 types of silanes of the general formulae

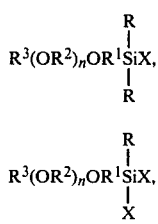

and $R^3(OR^2)_nOR^1SiX_3$, however, the use of only a single silane with the general formula

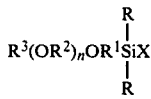

is excluded, wherein R represents a silicon-bonded organic radical other than the silicon-bonded oxyalkylene radical and X represents a silicon-bonded hydrolyzable group such as the chlorine atom, bromine atom, or an alkoxy group. Component (A) can also be produced by the cohydrolysis of 1 to 3 types of silanes with the above general formulae with 1 to 3 types of silanes of the general formulae $RSiX_3$, $R_2SiX_2$, and $R_3SiX$ where the cohydrolysis of a silane with the general formula

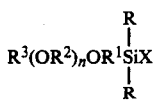

with a silane with the general formula R₃SiX is excluded. Alternatively, component (A) can also be produced by the cohydrolysis of 1 to 2 types of silanes with the general formulae

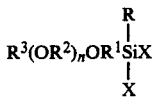

and

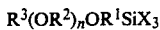

with a polyorganosiloxane possessing silanol end groups.

Component (B) is the component which cures component (A) at room temperature. Typical examples are organosilicon compounds such as silanes, siloxanes, and polysiloxanes which contain at least 2 silicon-bonded hydrolyzable groups per molecule. However, when component (A) possesses 2 silanol groups per molecule, component (B) contains at least 3 silicon-bonded hydrolyzable groups per molecule.

Examples of the silicon-bonded hydrolyzable group are alkoxy groups, acyloxy groups, N,N-dialkylamino groups N-alkylamido groups, N,N-dialkylaminoxy groups, ketoxime groups, and alkenoxy groups.

Component (B) can contain silicon-bonded organic radicals other than the silicon-bonded hydrolyzable groups and examples here are alkyl, alkenyl, aryl, haloalkyl, and cycloalkyl.

Illustrative examples of the organosilicon compounds are
methyltrimethoxysilane,
methyltriethoxysilane,
vinyltrimethoxysilane,
methylphenyldiethoxysilane,
3,3,3-trifluoropropyltrimethoxysilane,
methyltriacetoxysilane,
vinyltriacetoxysilane,
phenyltripropionoxysilane,
ethyltris(N,N-diethylamino)silane,
vinyltris(N-methyl-N-cyclohexylamino)silane,
dimethylbis(N,N-dibutylamino)silane,
methyltris(N-methylacetamido)silane,
methylvinylbis(N-ethylacetamido)silane,
methyltris(N,N-diethylaminoxy)silane,
phenyltris(N,N-diethylaminoxy)silane,
methyltris(methyl ethyl ketoxime)silane,
vinyltris(methyl ethyl ketoxime)silane,
3,3,3-trifluoropropyltris(methyl ethyl ketoxime)silane,
methyltris(isopropenoxy)silane,
ethyl polysilicate,
n-propylorthosilicate,
dimethyltetraacetoxydisiloxane,
pentamethyltris(N,N-diethylaminoxy)cyclotetrasiloxane, and
pentamethyltris(N,N-diethylaminoxy)trisiloxane.

The organosilicon compound is added under the criterion that the number of equivalents of silicon-bonded hydrolyzable groups is equal to or exceeds the number of equivalents of silanol groups in component (A).

When the organosilicon compound comprising component (B) cannot adequately accomplish curing, small quantities of curing accelerator catalysts comprising one or more of the following compounds can be added: metal salts of organic carboxylic acids, such as dibutyltin diacetate, dibutyltin dioctoate, dibutyltin dilaurate, cobalt naphthenate, tin octoate, iron octoate, and manganese octoate; metal alcoholates such as tetrabutyl titanate, tetraisopropyl titanate, bis(acetylacetonyl)-diisopropyl titanate, and tetrabutyl zirconate; and guanidine.

In addition to components (A) and (B), the room temperature-curable polyorganosiloxane composition of this invention can contain a filler such as fumed silica, hydrophobicized fumed silica, hydrophobicized precipitated silica, finely pulverized quartz, diatomaceous earth, calcium carbonate, and carbon black; pigments such as red iron oxide, titanium dioxide, zinc white, ultramarine, iron black, and carbon black; nonsagging agents; antimolds; organic solvents; and surfactants.

Room temperature-curable polyorganosiloxane compositions of this invention can be produced by methods in which component (A) and component (B) and other optional components are mixed in a mixer. Before use, the mixture is preferably defoamed during or after mixing. Such compositions which cure at room temperature in the presence of moisture are preferable stored in sealed containers.

The room temperature-curable polyorganosiloxane compositions of this invention cure at room temperature into a rubber or resin which rarely suffers from soiling and which will durably adhere to another substrate such as aluminum panels, painted stainless steel plates, tile, slate boards, precast concrete plates, and ALC without soiling material adjacent to the cured composition. For this reason, the composition is very useful as a sealant, caulking material, potting material, and adhesive which are particularly useful for construction.

This invention will be explained using demonstrational Reference Examples and Examples. "Parts" in the examples denotes "parts by weight" and the viscosity was measured at 25° C.

REFERENCE EXAMPLE 1

Synthesis of polyether-modified dichlorosilane

A polyether (529 parts) with the general formula

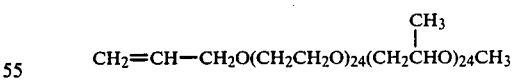

and toluene (250 parts) were placed in a four-neck flask equipped with a stirrer, a condenser with attached distillation, a thermometer, and a nitrogen gas inlet tube. The resulting mixture was then heated with stirring at reflux in order to remove azeotropically the water present in the polyether.

The above dehydrated polyether-toluene solution, 3.6 parts of a 1 wt % tetrahydrofuran solution of chloroplatinic acid and 46.7 parts of methylhydrogendichlorosilane were placed in a glass pressure reactor.

The mixture was heated to 90° C. and reacted at this temperature for 1 hour.

The pressure increased to 2.0 kg/cm² at the end of the reaction.

After the reaction, excess methylhydrogendichlorosilane and toluene were removed under reduced pressure to obtain a light-yellow, transparent liquid consisting of a polyether-modified dichlorosilane with the general formula

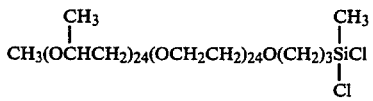

REFERENCE EXAMPLE 2

Synthesis of polyether-modified polyorganosiloxane I

A silanol group-terminated polydimethylsiloxane (180 parts, average molecular weight 4,500, viscosity 0.125 Pa.s) and toluene (600 parts) were placed in a 1,000 mL four-neck flask equipped with a stirrer, a condenser with attached distillation, and a thermometer. The resulting mixture was gradually heated with stirring and was then heated at reflux in order to remove the water azeotropically.

After removal of the water, the mixture was cooled to room temperature and then combined with 11.4 parts triethylamine.

The mixture was then heated to 70° C. with stirring and combined dropwise with 121.8 parts of the polyether-modified dichlorosilane synthesized in Reference Example 1 over about 1 hour while the temperature was maintained at 70° C.

After dripping in the dichlorosilane, the mixture was allowed to stand at 70°–75° C. for 1 hour, gradually heated to 100° C., allowed to stand at 100° C. for 3 hours and then cooled to room temperature.

After cooling, the triethylamine hydrochloride was filtered off to obtain a transparent toluene solution.

The toluene was distilled under reduced pressure to obtain a brown, transparent liquid (282 parts, viscosity 27.5 Pa.s). This brown, transparent liquid was analyzed which confirmed the production of a polyether-modified polyorganosiloxane with a molecular structure in which a portion of the methyl groups of a silanol group-terminated polydimethylsiloxane have been substituted with

This product is denoted as "polyether-modified polyorganosiloxane I" below.

EXAMPLE 1

Polyether-modified polyorganosiloxane I (100 parts) produced in Reference Example 2 was kneaded with calcium carbonate (70 parts, average particle size 1.4 μm) in a mixer to give a homogeneous composition. 2 parts of an aminoxysiloxane with the general formula

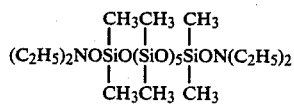

was combined with 1 part of an aminoxysiloxane with the general formula

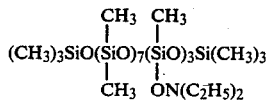

to prepare a curing agent.

The composition (120 parts) comprising the polyether-modified polyorganosiloxane I and calcium carbonate filler was kneaded with the curing agent (3 parts) in a mixer to homogeneity and then defoamed to obtain a room temperature-curable polyorganosiloxane composition.

The room temperature-curable polyorganosiloxane composition was filled into the joint (width 2 cm, depth 1 cm) between 2 adjacent 30×60×1 cm white ceramic boards and cured in a room at 25° C. for 1 week into a rubbery material. The boards were then allowed to stand outdoors at an angle of inclination of 75°.

For comparison, a room temperature-curable polyorganosiloxane composition was produced from the same quantities as above of a silanol group-terminated dimethylpolysiloxane (viscosity 15 Pa.s) and the above calcium carbonate and curing agent, filled into the joint between the white ceramic boards, and then cured into a rubbery material to inspect soiling.

Table 1 reports the results of the observation of the degree of soiling 1 month and 3 months after the beginning of the test. Adhesion of the rubbery cured material to the white ceramic boards was examined by pressing the rubbery cured material with the fingers after 3 months. The result showed that both room temperature-curable polyorganosiloxane compositions adhered well to the boards and could not be peeled off. As discussed above, the room temperature-curable polyoranosiloxane composition obtained from polyether-modified polyorganosiloxane I exhibited a significant suppression of soiling while not undergoing any decline in adhesion.

The tensile adhesive strength of the room temperature-curable polyorganosiloxane composition which had been produced by the method of this invention was tested by the method of JIS A5758. A glass plate was used as the substrate and Primer D from Toray Silicone Co., Ltd. was used as the primer. The tensile adhesive strength was 0.412 megapascal (MPa) after curing at room temperature for 2 weeks and failure was 100% cohesive failure.

TABLE 1

| | Results of the Inspection of the Degree of Soiling, I | | |
|---|---|---|---|
| | Base polymer in room temperature-curable | Outdoor exposure | |
| Type | polyorganosiloxane composition | 1 month | 3 months |
| This invention | polyether-modified polyorganosiloxane | neither the cured product nor the boards were soiled | neither the cured product nor the boards were soiled |

TABLE 1-continued

Results of the Inspection of the Degree of Soiling, I

| Type | Base polymer in room temperature-curable polyorganosiloxane composition | Outdoor exposure 1 month | 3 months |
|---|---|---|---|
| Comparison Example | silanol-terminated polydimethylsiloxane | streak soiling was observed for both the cured product and the lower board | soiling was observed on the cured product and over the entire surface of the board |

EXAMPLE 2

The composition (120 parts) prepared in Example 1 and composed of polyether-modified polyorganosiloxane I and calcium carbonate filler was kneaded with methyltris(methyl ethyl ketoxime)silane (12 parts) and dibutyltin dioctoate (0.2 parts) in a mixer to homogeneity and then defoamed in order to obtain a polyorganosiloxane composition which cured at room temperature in the presence of moisture.

For comparison, the composition prepared in Example 1 and consisting of silanol group-terminated polydimethylsiloxane and calcium carbonate filler was combined with methyltris(methyl ethyl ketoxime)silane and dibutyltin dioctoate in the same quantities in order to prepare a polyoranosiloxane composition which cured at room temperature in the presence of moisture. The degree of soiling was inspected by the method of Example 1 and the results were reported in Table 2. In order to examine the adhesion of the rubbery cured product to the white ceramic boards, the rubbery cured product was pressed with the finger after 3 months. Both polyorganosiloxane compositions curing at room temperature in the presence of moisture adhered well to the boards and could not be peeled off.

As discussed above, the polyorganosiloxane composition which cured at room temperature in the presence of moisture and which was prepared from polyether-modified polyorganosiloxane I exhibited a significant suppression of soiling while not undergoing any decline in adhesiveness.

The tensile adhesive strength of the room temperature-curable polyorganosiloxane composition which had been produced by the method of this invention was examined by the method of JIS A5758. A glass place was used as the substrate and Primer D from Toray Silicone Co., Ltd. was used as the primer. The tensile strength was 0.608 MPa after curing at room temperature for 2 weeks and failure was 100% cohesive failure.

EXAMPLE 3

The polyether-modified polyorganosiloxane I (100 parts) produced in Reference Example 2 was kneaded with fumed silica (20 parts, specific surface area 200 m²/g) in a mixer to homogeneity and then defoamed.

The resulting composition (120 parts) was kneaded with vinyltrimethoxysilane (6 parts) and tetrabutyl titanate (0.6 parts) in a mixer to homogeneity to produce a polyorganosiloxane composition curing at room temperature in the presence of moisture.

The polyorganosiloxane composition curable at room temperature in the presence of moisture was filled into a horizontal joint (width 1 cm, depth 0.8 cm) between 2 adjacent precast concrete plates, allowed to stand outdoors for 3 months. The soiling and adhesion were then inspected. Neither the rubbery cured product nor the precast concrete plate were found to be soiled. The rubbery cured product adhered well to the precast concrete plates and could not be peeled from the precast concrete plates by pressing with the fingers.

For comparison, a polyorganosiloxane composition curable at room temperature in the presence of moisture was produced by the above method with the exception that a mixture of a silanol group-terminated polydimethylsiloxane (95 parts, viscosity 15,000 cP) and a polyether-modified polymethylsiloxane (5 parts) with the average molecular formula

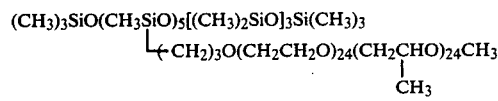

was used instead of the polyether-modified polyorganosiloxane I produced in Reference Example 2. The soiling and adhesion of the polyorganosiloxane composition curable at room temperature in the presence of moisture were inspected by the same method as above. The surrounding area of the joint precast concrete was slightly soiled. When the rubbery cured product was

TABLE 2

Results of the Inspection of the Degree of Soiling, II

| Type | Base polymer in polyorganosiloxane composition curable at room temperature and in the presence of moisture | Outdoor exposure time 3 months |
|---|---|---|
| This invention | polyether-modified polyorganosiloxane I | neither the cured product nor the boards were soiled |
| Comparison Example | silanol-terminated polydimethylsiloxane | soiling was observed on the cured product and over the entire surface of the lower board | pressed with the fingers, it was peeled off in places from the precast concrete plates.

EXAMPLE 4

A polyether-modified polyorganosiloxane with a molecular structure in which part of the methyl groups of a silanol group-terminated dimethylsiloxane-methylphenylsiloxane copolymer have been substituted with

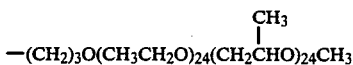

groups was synthesized by the method of Reference Example 2 with the exception that a silanol group-terminated dimethylsiloxane-methylphenylsiloxane copolymer (molar ratio of the former to the latter 90:10, viscosity 0.15 Pa.s) was used instead of the silanol group-terminated polydimethylsiloxane which was employed in Reference Example 2. This product is denoted as "polyether-modified polyorganosiloxane II" below.

A polyorganosiloxane composition curable at room temperature in the presence of moisture was prepared by the method of Example 2 with the exception that polyether-modified polyorganosiloxane II was used instead of the polyether-modified polyorganosiloxane I which was used in Example 2. The soiling and adhesion were inspected by the method of Example 2 and the same results as in Example 2 were obtained.

EXAMPLE 5

Instead of the polyether with the general formula

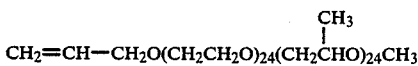

a polyether with the general formula $CH_2=CH-CH_2O(CH_2CH_2O)_6C_3H_7$ was addition reacted with methylhydrogendichlorosilane by the method of Reference Example 1 to synthesize a light-yellow, transparent liquid comprising a polyether-modified dichlorosilane with the general formula

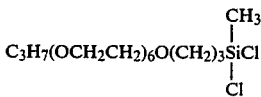

The above polyether-modified dichlorosilane, dimethyldichlorosilane, and methyltrichlorosilane (4:46:50 molar ratio) were hydrolozed with vigorous stirring in a xylene-acetone-water mixed solvent. The hydrogen chloride by-product and water were separated in order to obtain a solution containing 50 wt % polyorganosiloxane resin possessing 1.7 wt % silanol groups and methyl groups and $-(CH_2)_3O(CH_2CH_2O)_6C_3H_7$ groups as the organic groups.

Ethyltriacetoxysilane (20 parts) and dibutyltin diacetate (0.3 parts) were both dissolved into 100 parts of the resulting solution in order to prepare a polyorganosiloxane composition curable at room temperature in the presence of moisture.

This polyorganosiloxane composition curable at room temperature in the presence of moisture was thinly coated on an aluminum plate, cured in a room for 4 days and then allowed to stand outdoors for 3 months. The cured product remained absolutely unsoiled while adhering firmly to the aluminum plate.

That which is claimed is:

1. A room temperature-curable polyorganosiloxane composition consisting essentially of
   (A) a polyorganosiloxane which possesses at least one silicon-bonded oxyalkylene radical of the general formula $-R^1O(R^2O)_nR^3$ wherein each $R^1$ and $R^2$ represent a divalent alkylene radical, $R^3$ is a radical selected from alkyl, acyl, and hydrogen and n is 0 or an integer with a value $\geq 1$, and said polyorganosiloxane having at least 2 silanol groups per molecule and
   (B) a curing agent.
2. The composition according to claim 1 in which there is filler present.
3. The composition according to claim 2 in which the curing agent is an aminoxysiloxane.
4. The composition according to claim 3 in which the filler is calcium carbonate.
5. The composition according to claim 4 in which the aminoxysiloxane is a mixture of aminoxysiloxane having two aminoxy groups per molecule and aminoxysiloxane having three aminoxy groups per molecule.
6. The composition according to claim 2 in which the curing agent is a mixture of ketoximosilane and a tin catalyst.
7. The composition according to claim 6 in which the filler is calcium carbonate.
8. The composition according to claim 7 in which the oximosilane is methyltris(methylethylketoximo)silane and the tin catalyst is dibutyltindioctoate.
9. The composition according to claim 2 in which the curing agent is a mixture of alkoxysilane and a titanium catalyst.
10. The composition according to claim 9 in which the filler is fumed silica.
11. The composition according to claim 10 in which the alkoxysilane is vinyltrimethoxysilane and the titanium catalyst is tetrabutyltitanate.
12. The composition according to claim 1 in which the curing agent is a mixture of an acetoxysilane and a tin catalyst.
13. The composition according to claim 12 in which the acetoxysilane is ethyltriacetoxysilane and the tin catalyst is dibutyltindiacetate.
14. The composition according to claim 1 stored in a container sealed against the entry of moisture.
15. The product obtained by exposing the composition of claim 14 to moisture.

* * * * *